L. B. RICHARDSON.
Plows.

No. 140,434.                          Patented July 1, 1873.

UNITED STATES PATENT OFFICE.

LEVIN B. RICHARDSON, OF CARROLLTON, ILLINOIS.

IMPROVEMENT IN PLOWS.

Specification forming part of Letters Patent No. 140,434, dated July 1, 1873; application filed May 31, 1873.

*To all whom it may concern:*

Figure 1:
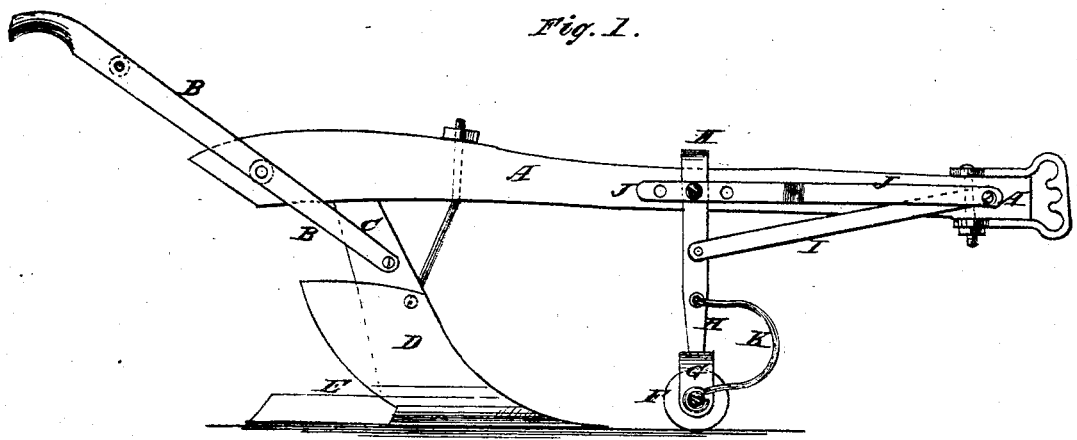
Figure 2:
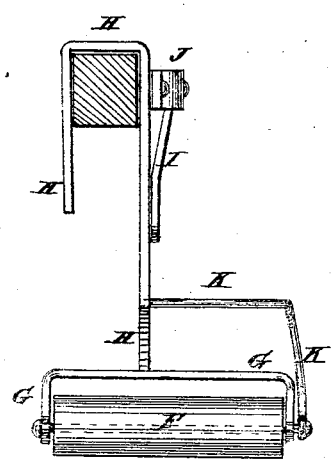

Be it known that I, LEVIN B. RICHARDSON, of Carrollton, in the county of Greene and State of Illinois, have invented a new and useful Improvement in Plows, of which the following is a specification:

Figure 1 is a side view of a plow to which my improvement has been applied. Fig. 2 is a rear view of the improvement, the plow-beam being shown in cross-section.

Similar letters of reference indicate corresponding parts.

My invention has for its object to furnish an improved attachment for plows, to roll down stubble and weeds, and hold them until turned under by the plow so as to wholly cover them and leave the ground clean. The invention consists in the roller, the bent bar, the bent or looped bar, the draft-bar, and the adjustable brace-bar, constructed and arranged in connection with each other, as hereinafter fully described, to adapt them for attachment to a plow, and in the combination of the guard with the roller, the bent bar, the bent or looped bar, the draft-bar, and the adjustable brace-bar, as hereinafter fully described.

A represents the beam, B the handles, C the standard, D the mold-board, and E the land-side, of an ordinary plow, about the construction of which parts there is nothing new. F is an iron roller, the journals of which revolve in the bent-down ends of the bar G, which extends along and parallel with the said roller. To the bar G is rigidly attached the lower end of the bar H, the upper part of which is bent twice at right angles, or into U-shape, to pass over the beam A to keep it in place, and at the same time allow the roller to rise and fall to conform to the inequalities of the ground. I is the draft-bar, the rear end of which is pivoted to the middle part of the bar H, and its forward end is pivoted to the side of the forward end of the beam A by a bolt. J is a brace-bar, the forward end of which is pivoted to the side of the forward end of the beam A by the same bolt that pivots the draft-bar I to said beam. The rear part of the bar J is secured to the bar H by a short bolt. Several holes are formed in the rear part of the brace-bar J to receive the bolt that secures it to the bar H, so that by shifting the said bolt from one to another of said holes the roller E may be moved toward or from the plow to adapt it for use with short or long grass or weeds. K is a rod, the outer end of which is attached to the plowed-land journal of the roller F. The rod K projects forward, is bent upward, rearward and inward, and its inner end is attached to the bar H. The rod K is designed to prevent the stubble or weeds from falling down toward the plowed land, so as not to be rolled down and held by the roller F, and consequently not fully covered by the plow.

Having thus described my invention, I claim as new and desire to secure by Letters Patent—

1. The roller F, bent bar G, bent or looped bar H, draft-bar I, and adjustable brace-bar J, constructed and arranged in connection with each other, substantially as herein shown and described, to adapt them for attachment to a plow, as and for the purpose set forth.

2. The combination of the guard K with the roller F, the bent bar G, the bent or looped bar H, the draft-bar I, and the adjustable brace-bar J, substantially as herein shown and described, and for the purpose set forth.

LEVIN B. RICHARDSON.

Witnesses:
V. F. WILLIANS,
J. P. MORROW.